(12) United States Patent
Govorkov et al.

(10) Patent No.: US 7,158,553 B2
(45) Date of Patent: Jan. 2, 2007

(54) MASTER OSCILLATOR/POWER AMPLIFIER EXCIMER LASER SYSTEM WITH PULSE ENERGY AND POINTING CONTROL

(75) Inventors: Sergei V. Govorkov, Boca Raton, FL (US); Alexander O. Wiessner, Coconut Creek, FL (US); Rainer Paetzel, Dransfeld (DE); Igor Bragin, Goettingen (DE)

(73) Assignee: Lambda Physik AG, Goettingen (DE)

( * ) Notice: Subject to any disclaimer, the term of this patent is extended or adjusted under 35 U.S.C. 154(b) by 333 days.

(21) Appl. No.: 10/776,404

(22) Filed: Feb. 11, 2004

(65) Prior Publication Data

US 2004/0179571 A1 Sep. 16, 2004

Related U.S. Application Data

(60) Provisional application No. 60/503,692, filed on Sep. 17, 2003, provisional application No. 60/463,988, filed on Apr. 18, 2003, provisional application No. 60/450,382, filed on Feb. 27, 2003, provisional application No. 60/448,630, filed on Feb. 20, 2003, provisional application No. 60/447,409, filed on Feb. 14, 2003.

(51) Int. Cl.
*H01S 3/22* (2006.01)
(52) U.S. Cl. ............................. 372/57; 372/58
(58) Field of Classification Search .......... 372/57, 372/13, 55, 58
See application file for complete search history.

(56) References Cited

U.S. PATENT DOCUMENTS

| | | | | |
|---|---|---|---|---|
| 4,122,390 A | * | 10/1978 | Kollitz et al. | 340/870.38 |
| 5,142,543 A | * | 8/1992 | Wakabayashi et al. | 372/32 |
| RE34,192 E | * | 3/1993 | Baer | 372/10 |
| 5,237,331 A | * | 8/1993 | Henderson et al. | 342/54 |
| 5,272,513 A | * | 12/1993 | Vahala et al. | 356/28.5 |
| 6,036,911 A | * | 3/2000 | Allison et al. | 264/401 |
| 6,141,086 A | * | 10/2000 | Vahala et al. | 356/28.5 |
| 6,370,174 B1 | | 4/2002 | Onkels et al. | 372/38.04 |
| 6,381,257 B1 | | 4/2002 | Ershov et al. | 372/57 |
| 6,529,321 B1 | | 3/2003 | Pan et al. | 359/360 |
| 6,567,450 B1 | * | 5/2003 | Myers et al. | 372/55 |
| 6,625,191 B1 | | 9/2003 | Knowles et al. | 372/55 |
| 6,704,339 B1 | * | 3/2004 | Lublin et al. | 372/57 |
| 6,721,344 B1 | * | 4/2004 | Nakao et al. | 372/55 |

(Continued)

OTHER PUBLICATIONS

Hunt et al. ("Suppression of self-focusing through low-pass spatial filtering and relay imaging". Applied Optics. vol. 17, No. 13. p. 2053-2057, Jul. 1, 1978).*

*Primary Examiner*—Minsun Oh Harvey
*Assistant Examiner*—Phillip Nguyen
(74) *Attorney, Agent, or Firm*—Stallman & Pollock, LLP

(57) ABSTRACT

Pulse parameters of a gas discharge laser system can be optimized and controlled for precision applications such as microlithography. Important laser pulse parameters typically vary in the beginning of a pulse burst, and the directionality of the output beam typically varies throughout the burst. In order to improve the performance of the laser system, the variation at the beginning of a pulse burst can be eliminated by extending the pulse pattern and shuttering the output during periods of significant parameter variation. A fast shutter such as an acousto-optical modulator can be used to prevent output during the burst transition processes. Elements such as acousto-optical cells also can be used in combination with a fast position sensor to steer the direction of the output beam, in order to adjust for variations in the direction of the beam between pulses in a burst.

30 Claims, 10 Drawing Sheets

U.S. PATENT DOCUMENTS

| | | |
|---|---|---|
| 6,741,627 B1 * | 5/2004 | Kitatochi et al. ............. 372/57 |
| 6,798,812 B1 * | 9/2004 | Rylov et al. .................. 372/55 |
| 6,973,111 B1 * | 12/2005 | Yamashita et al. ............ 372/55 |
| 7,079,564 B1 * | 7/2006 | Fallon et al. ................. 372/55 |
| 2002/0141039 A1 * | 10/2002 | Mermelstein et al. ....... 359/305 |
| 2002/0141470 A1 * | 10/2002 | Nakao et al. ................. 372/55 |
| 2002/0154668 A1 * | 10/2002 | Knowles et al. .............. 372/55 |
| 2002/0154671 A1 * | 10/2002 | Knowles et al. .............. 372/57 |
| 2003/0043876 A1 | 3/2003 | Lublin et al. ................. 372/55 |
| 2003/0142714 A1 * | 7/2003 | Yamashita et al. ............ 372/55 |
| 2003/0219056 A1 | 11/2003 | Yager et al. .................. 372/57 |
| 2004/0022291 A1 | 2/2004 | Das et al. ..................... 372/55 |
| 2004/0182838 A1 * | 9/2004 | Das et al. ............. 219/121.76 |

* cited by examiner (side view)

(end view)

MASTER OSCILLATOR/POWER AMPLIFIER EXCIMER LASER SYSTEM WITH PULSE ENERGY AND POINTING CONTROL

CLAIM OF PRIORITY

This patent application claims priority to U.S. provisional patent applications:

"MASTER OSCILLATOR/POWER AMPLIFIER EXCIMER LASER SYSTEM WITH IMPROVED CONTROL OF INDIVIDUAL PULSE PARAMETERS," No. 60/447,409, filed Feb. 14, 2003;

"MASTER OSCILLATOR/POWER AMPLIFIER EXCIMER LASER SYSTEM WITH IMPROVED CONTROL OF INDIVIDUAL PULSE PARAMETERS," No. 60/450,382, filed Feb. 27, 2003;

"MASTER OSCILLATOR/POWER AMPLIFIER EXCIMER LASER SYSTEM WITH IMPROVED CONTROL OF INDIVIDUAL PULSE PARAMETERS," No. 60/463,988, filed Apr. 18, 2003;

"MOPA EXCIMER LASER SYSTEM," No. 60/448,630, filed Feb. 20, 2003; and

"MOPA EXCIMER OR MOLECULAR FLUORINE LASER SYSTEM WITH STABLE BEAM POINTING," No. 60/503,692, filed Sep. 17, 2003; all of which are hereby incorporated herein by reference.

TECHNICAL FIELD OF THE INVENTION

The present invention relates to systems and methods for optimizing and controlling pulse parameters and directionality in a multi-chamber laser system.

BACKGROUND

Semiconductor manufacturers are currently using deep ultraviolet (DUV) lithography tools based on KrF-excimer laser systems, operating at wavelengths around 248 nm, as well as ArF-excimer laser systems, which operate at around 193 nm. Vacuum UV (VUV) tools are based on $F_2$-laser systems operating at around 157 nm. These relatively short wavelengths are advantageous for photolithography applications because the critical dimension, which represents the smallest resolvable feature size that can be produced photolithographically, is proportional to the wavelength used to produce that feature. The use of smaller wavelengths can provide for the manufacture of smaller and faster microprocessors, as well as larger capacity DRAMs, in a smaller package. In addition to having smaller wavelengths, such lasers have a relatively high photon energy (i.e., 7.9 eV) which is readily absorbed by high band gap materials such as quartz, synthetic quartz ($SiO_2$), Teflon (PTFE), and silicone, among others. This absorption leads to excimer and molecular fluorine lasers having even greater potential in a wide variety of materials processing applications. Excimer and molecular fluorine lasers having higher energy, stability, and efficiency are being developed as lithographic exposure tools for producing very small structures as chip manufacturing proceeds into the 0.18 micron regime and beyond. Master Oscillator Power Amplifier (MOPA) excimer laser systems have an advantage of power scalability combined with improved spectral parameters, since power scaling is not traded off for spectral narrowness, as is the case in a traditional single-oscillator laser. Thus, the MOPA concept is becoming a mainstream route to increased throughput of chip manufacture, with ever increasing degree of minituarization.

The desire for such submicron features comes with a price, however, as there is a need for improved processing equipment capable of consistently and reliably generating such features. Further, as excimer laser systems are the next generation to be used for micro-lithography applications, the demand of semiconductor manufacturers for powers of 40 W or more to support throughput requirements leads to further complexity and expense.

Excimer laser systems have the potential to meet the target performance on spectral purity and high average power as required for applications such as microlithography. Such laser systems must deliver very high spectral purity, as well as a high average power of at least 40 W in order to support the throughput requirements of advanced lithography scanner systems. In many microlithography and other applications the laser is triggered by the scanner in order to correlate the light pulse with the condition of the scanner. A typical trigger pattern is a burst with a varying on/off ratio. Several of the laser pulse parameters, such as the pulse energy and pulse spectrum, vary in the beginning of the burst, and are influenced by the change in the burst pattern. At the same time, these laser pulse parameters can be of critical importance to the process. The time necessary for the laser system to adapt to a change in the requested laser parameter or trigger pattern can lead to a reduction of the system availability, such that it can be desirable to eliminate that time delay.

Further, current optical microlithography processes allow printing of extremely small feature sizes for integrated circuits, with a 65 nm node being in development at this time. At this level of resolution level, however, the influence of other laser parameters, such as the pointing instability of the output laser beam, becomes non-negligible. Output beam pointing can change by as much as several hundred microradians within a burst of several hundred pulses. Existing systems are not able to correct for such an error on a time scale that is less than time interval between pulses, such as 160 microseconds at repetition rate of 6 kHz.

DETAILED DESCRIPTION

Figure 1:
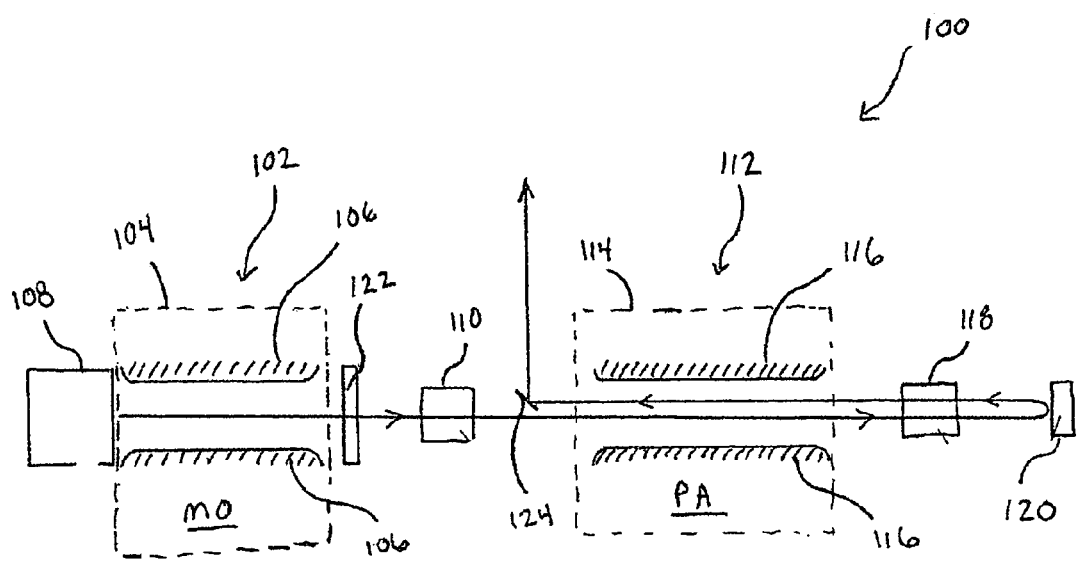
FIG. 1 is a diagram of a MOPA system that can be used with embodiments of the present invention.
Figure 1:
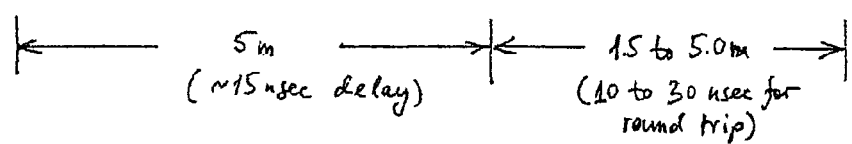

As semiconductor manufacturers move toward the production of chips with smaller sizes, the requirements on the processing and manufacturing equipment, including the laser light sources, are ever increasing. In laser systems used for photolithography applications, for example, it would be desirable to move toward higher repetition rates, increased energy stability and dose control, increased system uptime, narrower output emission bandwidths, improved wavelength and bandwidth accuracy, and improved compatibility with stepper/scanner imaging systems. It also would be desirable to provide lithography light sources that deliver high spectral purity and extreme power, but that also deliver a low cost chip production. Requirements of semiconductor manufacturers for higher power and tighter bandwidth can place excessive, and often competing, demands on current single-chamber-based light sources. Systems and methods in accordance with various embodiments of the present invention can overcome many of these obstacles by taking advantage of a dual-gas-discharge-chamber technology referred to herein as MOPA (Master Oscillator-Power Amplifier) technology. MOPA technology can be used to separate the bandwidth and power generators of a laser system, as well as to control each gas discharge chamber separately, such that both the required bandwidth and pulse energy parameters can be optimized. Using a master oscillator (MO), for example, an extremely tight spectrum can be generated for high-numerical-aperture lenses at low pulse energy. A power amplifier (PA), for example, can be used to intensify the light, in order to deliver the power levels necessary for the high throughput desired by the chip manufacturers. The MOPA concept can be used with any appropriate laser, such as KrF, ArF, and $F_2$-based lasers.

A MOPA system can be arranged in a single pass amplifier system, where an oscillator beam makes a single pass through a power amplifier chamber before being transmitted as an output beam, or can be arranged in a multi-pass configuration. In a "multi-pass" amplifier configuration, an oscillator beam output from a master oscillator can make at least two separate passes through the discharge chamber of the amplifier. The use of at least one additional pass can allow for an increase in gain, and can provide the ability to obtain higher output pulse energy with lower input pulse energy. Such a configuration can also be used to drive the PA into a state of saturation, thereby reducing pulse-to-pulse energy fluctuations and improving beam homogeneity. A multi-pass configuration also can allow the system to effectively "stretch" the amplified pulse, which can lead to a relaxed requirement of the synchronization precision and, therefore, greater pulse energy reproducibility.

Running an extremely high gain in a multi-pass amplifier can have some drawbacks, however, as there can be an increased level of amplified spontaneous emission (ASE) in the laser output. The high gain also can result in undesirable feedback to the MO. Therefore, certain embodiments can provide optical decoupling between a PA and an MO, as well as between passes of a beam through a PA. By optically decoupling the PA and the MO, high output pulse energy can be obtained with low energy fluctuations. Further, ASE can be suppressed to less than 0.1% of the total laser output.

An exemplary MOPA configuration 100 is shown in FIG. 1, where a master oscillator (MO) 102 is formed by a first discharge chamber 104 having disposed therein a pair of electrodes 106 on either side of the beam path through the MO. The MO further includes a line-narrowing optics module 108 for narrowing the oscillator beam in the discharge chamber 104, and an outcoupler module 122. Although not shown, it should be recognized by one of ordinary skill in the art that various other elements can be included in the oscillator which are not shown, such as output beam diagnostic tools, circuits for forming a discharge pulse, and electronic controls.

A power amplifier (PA) 112 can be positioned along the beam path a distance from the MO, such as a distance comparable to the pulse length in free space, or at least half of the pulse length. Such separation can cause any amplified spontaneous emission (ASE) from the PA to be delayed with respect to the initial stages of pulse formation in the MO, such that pulse formation is not disturbed. A spatial filter 110 can be located along the beam path between the MO and the PA, which can serve to further de-couple the MO and the PA, and which can modify the size of beam size as described herein. The PA can include a discharge chamber 114 containing at least one pair of electrodes 116 on either side of the beam path. In a single pass configuration, the beam serves as an output beam after passing through the power amplifier 112.

Once the beam makes a first pass through the PA in a multi-pass configuration, the beam can pass through a second spatial filter 118 and be retro-reflected by a retro-reflector 120 for a second pass through the second spatial filter 118 and the PA 112. The beam is coupled away from the PA path by reflector 124. The retro-reflector 120 can be removed a distance from the PA, such as a distance that is equal to a portion of the pulse length. Such separation can help to increase the "time window" of amplification, resulting in the overall gain being less sensitive to the time jitter between successive discharges.

In certain embodiments, the retro-reflector must be a distance of at least half the pulse length away from the MO. This separation ensures that photons originating in the oscillator and amplified in the PA, which pass through the spatial filters, will not be amplified in the MO, as they arrive after the inversion population has been depleted. The second spatial filter 118 can serve to decouple successive passes of the beam through the PA, thereby reducing the amount of the ASE in the output beam. The spatial filters used can vary between embodiments, but generally can be any appropriate spatial filters, such as those formed by cylindrical lenses and slits. In certain embodiments, it may be less desirable to use commonly known spatial filters based on spherical lenses and pin-holes. In utilizing cylindrical lenses to form a spatial filter, a much lower intensity can be obtained at the focal point, the formation of a plasma can be avoided, and the lifetime of the slits can be greatly extended.

Systems and methods in accordance with various embodiments of the present invention can utilize a MOPA configuration wherein a single oscillator is used with one or more power amplifiers, or wherein several lasers are run in parallel with a combined output. It should be understood, however, that several of the described improvements are applicable to a laser consisting of a single oscillator in either a single or multi-pass configuration. While the invention can be beneficial to applications such as micro-lithography, such an application is exemplary and advantages of the various embodiments can serve many other applications requiring control of the pulse energy and spectrum in burst mode.

In a MOPA system in which a typical trigger pattern is used, with a varying burst on/off ratio, laser pulse parameters such as the pulse energy and pulse spectrum can vary in the beginning portion of each burst. The time necessary for the laser system to adapt to variations in the critical laser parameters or trigger patterns can lead to a reduction of system availability and/or performance. Elimination of the delay can be achieved in one approach by eliminating laser output during these transition periods, when the laser parameters are changing due to the changes of the trigger pattern. For instance, the laser can be started before the output is needed, and allowed to pulse with blocked output, thereby avoiding the transition processes.

Pulses required to maintain the optimum status of an excimer laser system, and to adapt to a changed requirement, can be generated without disturbing the application. In a simple case, this can be achieved when operating the laser with a closed beam shutter. The practical limitation in such an approach is the speed of the mechanical beam shutter. It therefore can be desirable to utilize a shutter that can open and close the beam path between consecutive laser pulses at a repetition rate of up to about 10 kHz. A standard electro-mechanical shutter cannot easily meet this requirement.

Figure 2:
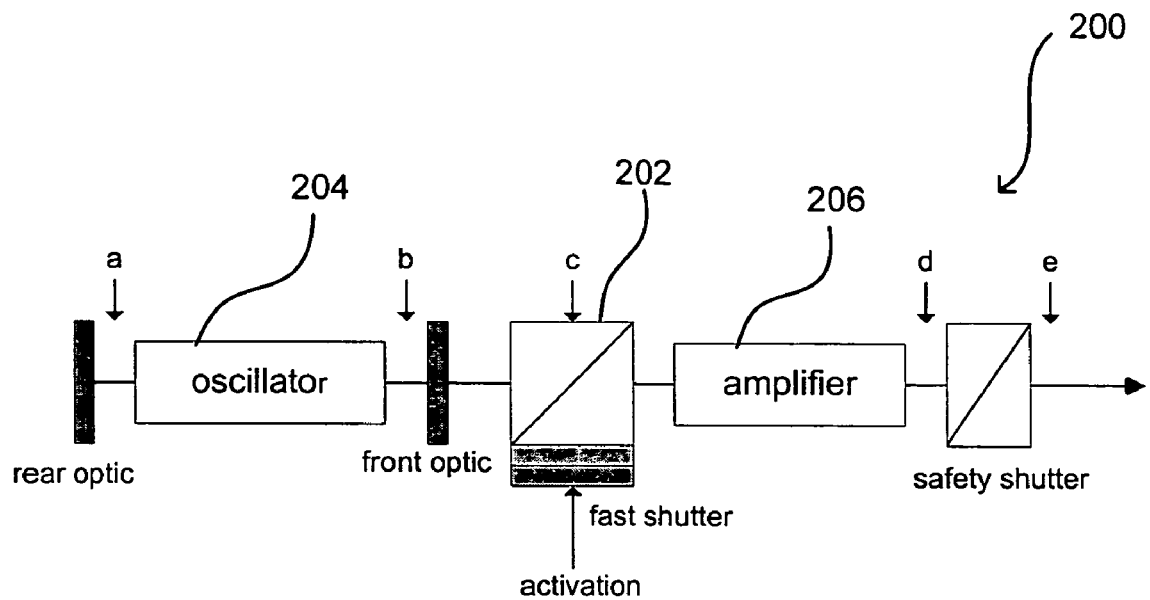
FIG. 2 is a diagram of a MOPA system using a fast shutter in accordance with one embodiment of the present invention.

Systems and methods in accordance with various embodiments of the present invention can overcome these and other limitations of existing MOPA laser systems by utilizing a device capable of functioning as a fast beam shutter, such as an acousto-optical (AO) modulator, an electro-optical (EO) modulator, or a galvo-mirror. Such a device can be used in addition to a safety shutter, which is typically a mechanical shutter. For a standard excimer laser, a fast shutter can be situated intra-cavity, or can be positioned externally in the laser output. FIG. 2 shows an exemplary arrangement 200 for a MOPA system with placement of the fast shutter 202 at position c. Positions a, b, or c can be suitable for an oscillator 204, whereas positions a, b, c, d, or e can be utilized for a system with both an oscillator 204 and amplifier 206. An oscillator/amplifier configuration allows the shutter to be placed into the optical path from the oscillator, or inside the resonator of the oscillator. The optical load on the shutter can be kept low in either case. For excimer wavelengths such as 248 nm, 193 nm, and 157 nm, highly transparent material, such as $SiO_2$ (only for 248 nm) and $CaF_2$, can be used to provide acousto-optical modulation.

Figure 3:
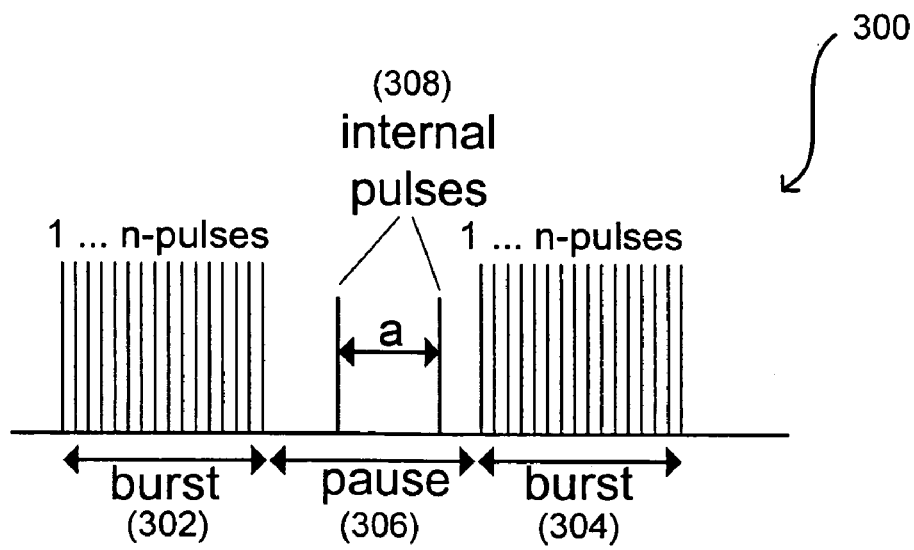
FIG. 3 is a diagram of a trigger scenario that can be used with systems such as those shown in FIGS. 1 and 2.

An advantage to such an approach is the minimization in recovery time for the laser to return to a fully operational condition. FIG. 3 shows a trigger scenario for a laser system with burst trigger operation, including bursts 302, 304, burst pauses 306, and internal trigger pulses 308 for stabilization. The internal pulses 308 can be used to keep the laser system at a stable condition. In a practical case, the maximum recovery time can be equal to the inverse of the minimum repetition rate of the laser. Essentially, this is the time period between the signal from the scanner to resume operation and the first internal trigger pulse. A pre-trigger signal from the scanner can be arranged, which can be utilized to avoid the recovery time of the system. The repetition rate of the internal pulses can be set to achieve an optimum compromise between recovery time, achieved stability, and operating cost. The operating cost can be a factor due to the internal pulses wearing on components of the chambers and laser gas.

Figure 4:
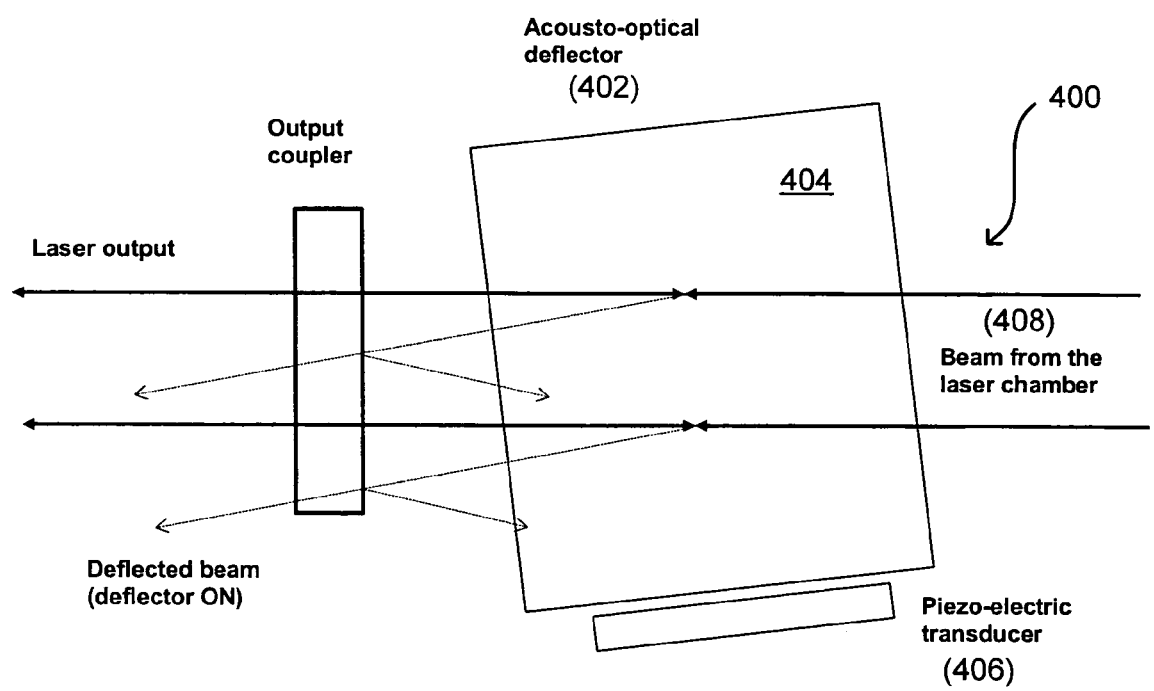
FIG. 4 is a diagram of an acousto-optic deflector that can be used with one of the systems of FIGS. 1 and 2.

FIG. 4 shows an exemplary operating principle for an intra-cavity (such as at position "b" in FIG. 2) shutter configuration 400 based on an acousto-optical (AO) deflector 402. An AO deflector 402 can consist of a transparent media 404 with a piezo-electric transducer 406 attached to one side. The transducer 406 can be excited at a high frequency, such as on the order of 20 MHz to 200 MHz, in order to produce an acoustic wave in the media 404. The acoustic wave can induce modulation of the refractive index in the media, such as in the form of a sinusoidal-profile volume grating. An optical beam from a laser chamber can diffract on this "grating" when the Bragg condition is satisfied, such as given by:

$$\theta = \theta_B$$

$$\sin(\theta_B) = \lambda/(2\Lambda)$$

where $\theta$ is incidence angle, $\lambda$ is the optical wavelength, $\theta_B$ is the Bragg angle, and $\Lambda$ is the grating period, as known in the art. When the deflector is on, a significant portion of the laser beam 408, such as on the order of 80% or more, can be deflected and removed from the resonator such that no oscillations and, therefore, no outputs occur. When the acoustic wave is off, the deflector will not disturb the operation of the laser. In other embodiments, depending upon the orientation of the modulator, no oscillations occur when the deflector is off, such that the oscillator beam when transmitted directly through the modulator does not enter the amplifier. In such an embodiment oscillations occur only when the modulator is on and deflects the beam into the amplifier. The modulator in either can receive two input values, corresponding to an off or zero value, and an on or non-zero value. As mentioned, in some embodiments it might be desired that the AO deflector acts as an "open" shutter in a normal state, and only prevents output when the acoustic wave is applied. The time constant of the AO deflector can be on the order of about 100 ns to 200 ns per millimeter of the beam size, which can lead to better than 1 µs resolution if the beam is about 5 mm wide. This can allow for practically instantaneous switching between on/off states at the pulse edges. The diffraction efficiency of AO deflectors in the UV optical range can be better than 80%. The deflection angle can depend on the acoustic frequency and optical wavelength, and can be on the order of several mrad. For example, assuming excitation frequency of about 200 MHz, the total deflection angle is about 6 mrad for a 157 nm beam. The acceptance angle is on the order of 1 mrad. For these two reasons, the plane containing the deflection angle can be advantageously oriented along the short axis of a beam.

The AO deflector can be made of any material that is highly transparent for UV and VUV beams, such as for example $CaF_2$, $MgF_2$, $BaF_2$, quartz, de-hydrated or fluorinated fused silica, and sapphire. In birefringent materials, such as $MgF_2$, polarization effects can be used to enhance the diffraction efficiency, such as by using non-critical phase matching for increased acceptance angle.

Figure 5:
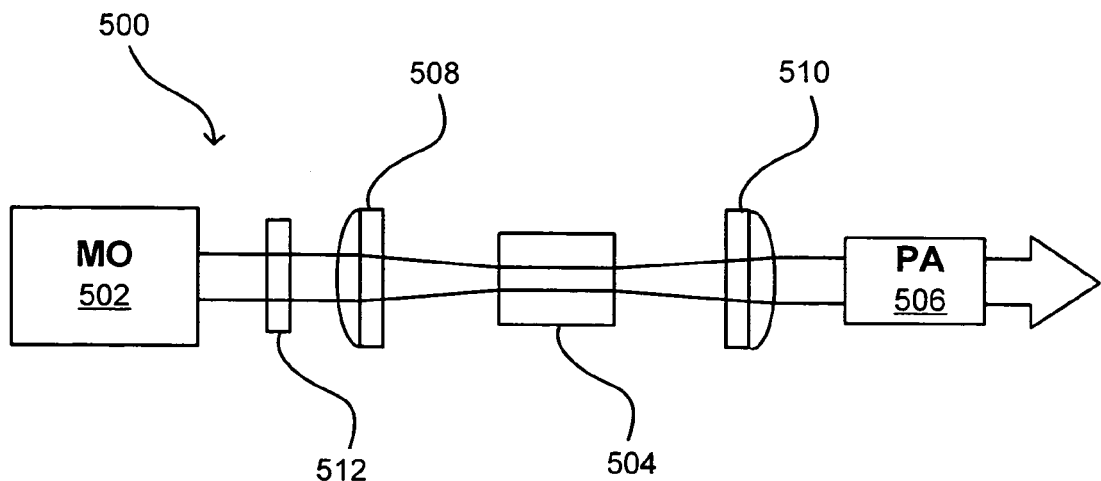
FIG. 5 is a diagram of a MOPA system using an acousto-optic (AO) deflector such as that shown in FIG. 4.

FIG. 5 shows a block-diagram of an optical layout 500 for an AO deflector system in accordance with an embodiment of the present invention using a MOPA configuration. Here, the output beam from the master oscillator (MO) 502 is modulated by an AO deflector 504, serving as a high speed shutter and allowing the beam to pass to the power amplifier (PA) 506. Cylindrical lenses 508 and 510 can be used to match the beam size to the active area of the AO deflector 504, as explained below. A half-wave plate 512 can be used to adjust a polarization direction of the beam, such as for optimum deflection efficiency. The power amplifier 506 can employ any of a number of single- or multiple-pass configurations including those discussed herein.

Figure 6:
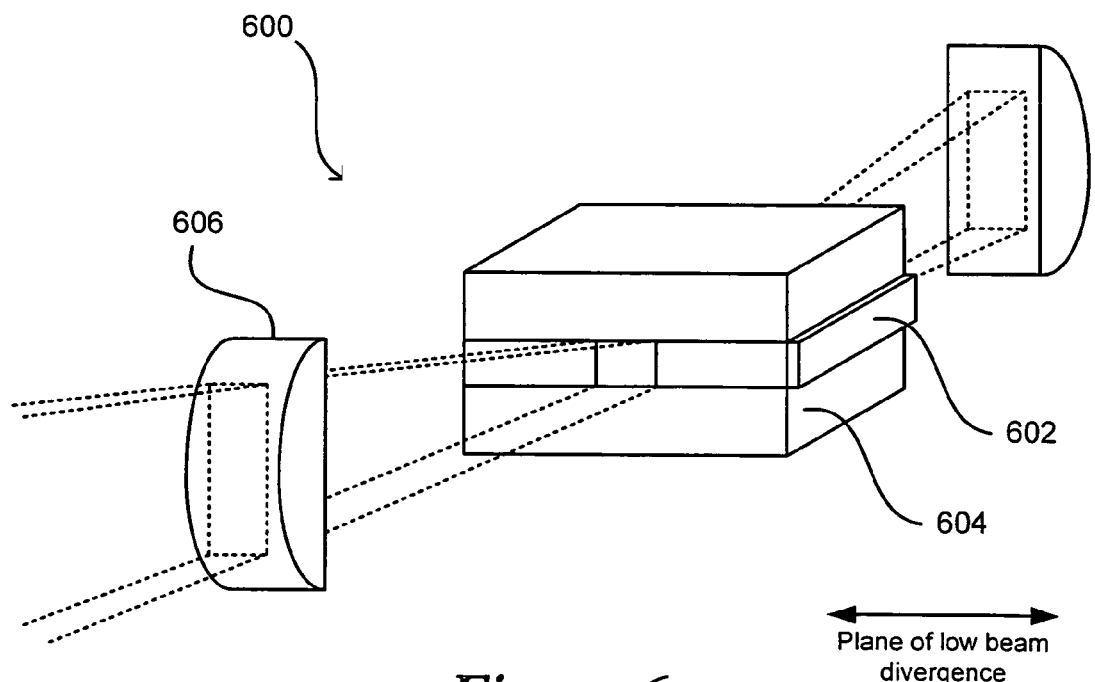
FIG. 6 is a perspective view of the AO deflector of FIG. 5.
Figure 9:
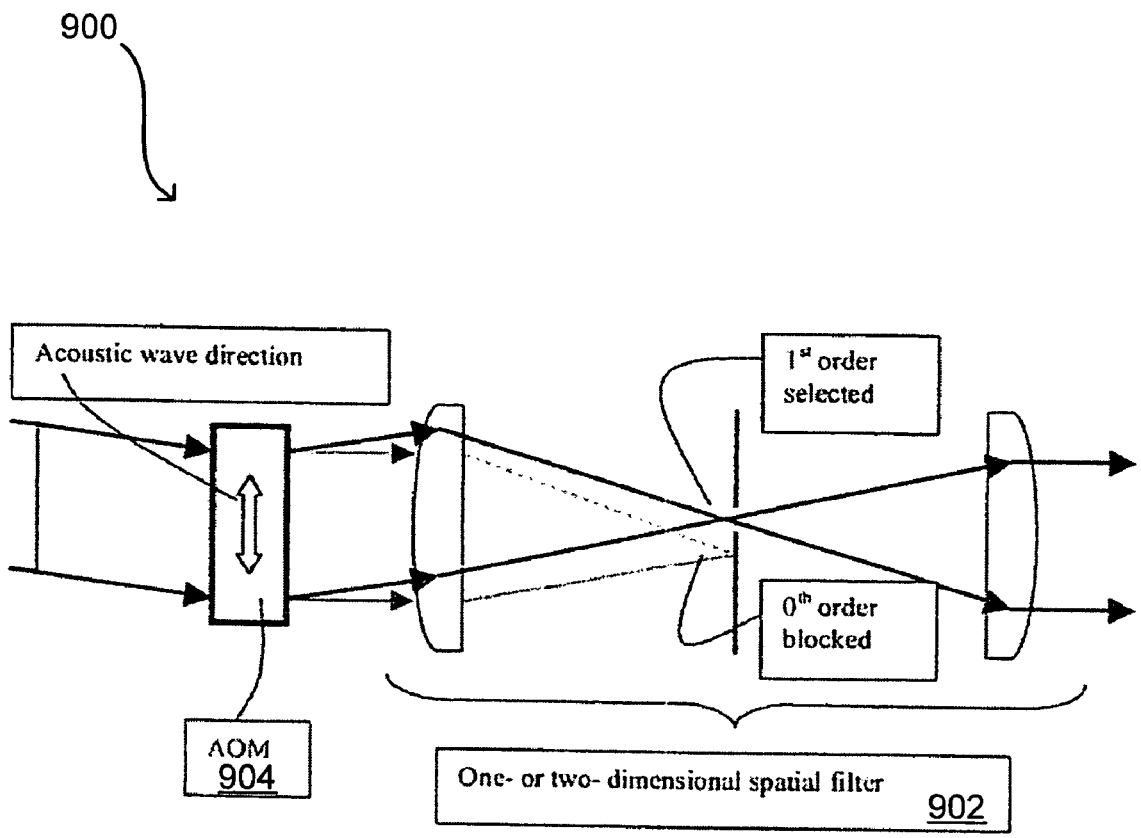
FIG. 9 is a diagram of an AO modulator and spatial filter configuration that can be used with a MOPA system in accordance with embodiments of the present invention.

FIG. 6 shows another view of an exemplary AO deflector arrangement 600. Typically, an excimer laser beam will have a rectangular cross-section, with the divergence in short axis plane being substantially lower than that of the long axis plane. An AO deflector can have an active area width of a few millimeters, such as on the order of about 2 mm, with a deflection angle plane being perpendicular to the 2 mm dimension. An acoustic transducer 602 can be attached to the side of a block of optical material 604 with sufficient transparency at the laser wavelength. The transducer 602 can emit an acoustic wave in the X-Z plane, for example, which can cause a diffraction of the beam on the refractive index grating created by the acoustic wave. The acceptance angle of an AO deflector can be on the order of about 1 mrad. It therefore can be advantageous to orient the short (low divergence) axis of the beam parallel to the deflection plane, as shown in FIG. 9. Such an arrangement also can make it easier to separate the diffracted beam from the transmitted beam, since the deflection angle can be on the order of several milliradians. The beam can be focused in the long axis plane by a cylindrical lens 606, in order to match the width of the active area. A second cylindrical lens 608 can re-collimate the beam to the original condition.

Figure 7:
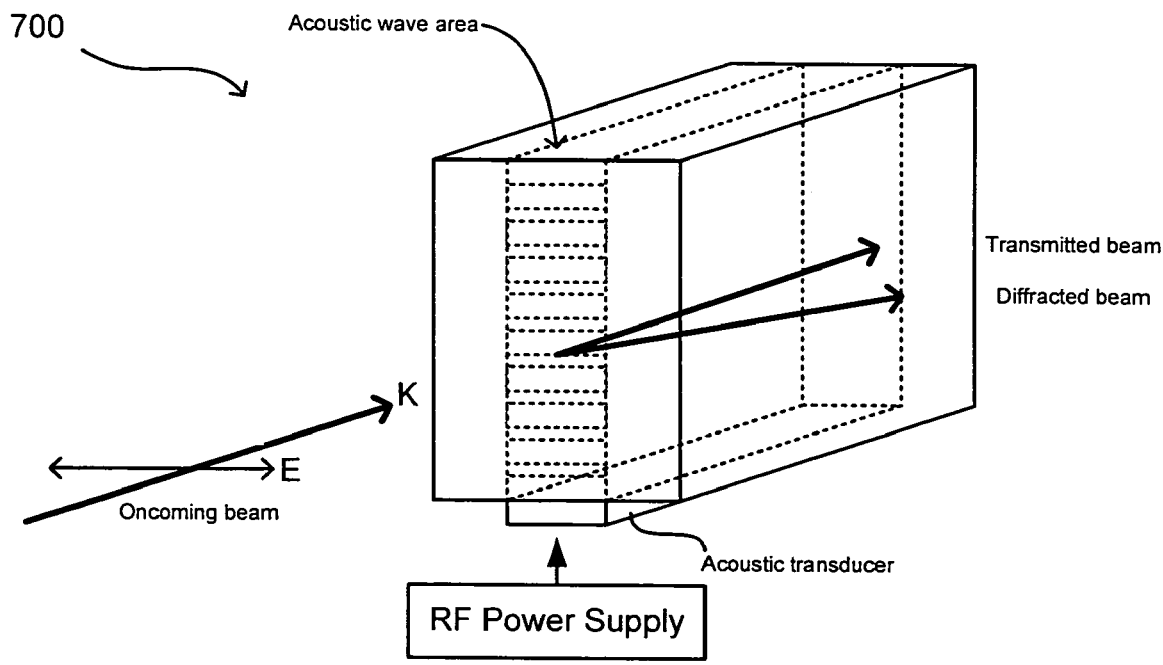
FIG. 7 is another perspective view of an AO deflector.

FIG. 7 shows an expanded view of an AO deflector arrangement 700. The beam deflection can occur in the plane of propagation of the acoustic wave. The major portion of the beam can be deflected, with the remaining portion propagating without a change in direction. The non-deflected portion can be blocked, such as by an aperture, such that the contrast of the shutter can be maximized. The transmittance therefore can be approximately equal to the diffraction efficiency. The resulting energy loss can be compensated for by amplification in a PA. An AO deflector also can be used at the output of the system, downstream of a PA. Potential disadvantages to such an arrangement can include a higher intensity of the beam in the AO deflector, and a corresponding shorter lifetime of the deflector, as well as a greater amount of energy loss due to diffraction efficiency.

Figure 8:
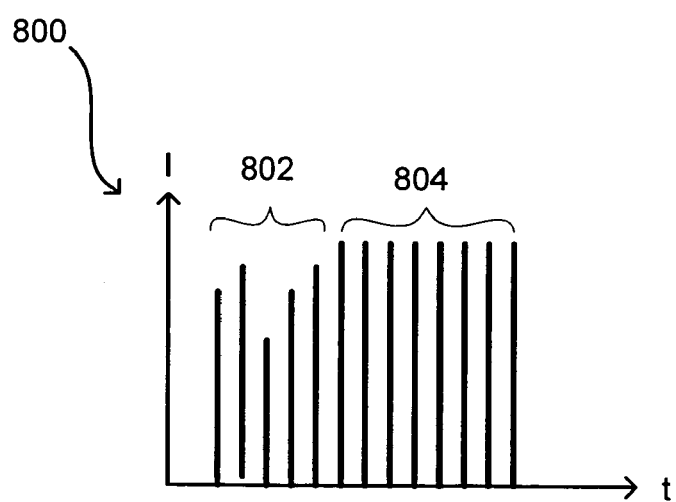
FIG. 8 is an intensity plot for a pulse burst that can be generated in a chamber.

FIG. 8 shows a plot 800 of burst intensity using such an AO shutter, wherein several initial pulses 802 can be eliminated in the burst of pulses from the laser, which can have inferior parameters compared to the steady-state pulses 804. In one example, an application process (e.g. microstepper) can provide an "inhibit" signal that turns off the acoustic wave, thereby blocking the beam going into the amplifier portion of the system.

FIG. 9 shows an arrangement 900 in accordance with an embodiment that utilizes a simple optics configuration. A spatial filter 902 is positioned after the AO modulator 904, such that the filter can serve a number of purposes. For instance, the spatial filter can be used to separate the desired first order from the zeroth order of the AO modulator. The spatial filter also can function to remove amplified spontaneous emission (ASE) in the incident beam, as well as to match the beam size for further application, such as pulse amplification. As positioned in FIG. 9, the AO modulator and spatial filter can function to select the first order of the deflected beam, remove the ASE, and shape the size of the beam. Whether or not a spatial filter is used can depend, at least in part, on the amount of space available for the transmitted and deflected beams to separate.

When an AOM operates as a Bragg device, the incident laser beam can be oriented to enter the acoustic field at the Bragg angle $\theta_B = \lambda/2\Lambda$, where $\lambda$ is the wavelength of the laser light and $\Lambda$ is the acoustic wavelength. The beam separation or angular deviation between the zeroth order and the first order is twice the Bragg angle, given by:

$$\theta = 2\theta_B \lambda/\Lambda$$

In an example using a fused silica AO modulator with a 250 MHz acoustic frequency, the acoustic wavelength is $\Lambda=23.8$ μm with a sound speed of 5.96 mm/μs and an optical wavelength ($\lambda$) of 193 nm. Therefore, the angle deviation $\theta=\lambda/\Lambda=8.1$ mrad. A spatial filter can easily separate the desired first order from the zeroth order of the beam. For reducing surface losses, an AO modulator and lens can work at the Brewster angle or with an AR coating.

Spatial filters are well known in the art, and are commonly used for removing high-spatial frequency features from beams, as well as combining the functions of magnification and imaging. See, for example, J. T. Hunt, P. A. Renard, W. W. Simmons, Applied Optics, vol. 16, p. 770 (1977) or J. T. Hunt, J. A. Glaze, W. W. Simmons, P. A. Renard Applied Optics, vol. 17, p. 2053 (1978). Such spatial filters consist of two spherical lenses, similar to that shown in FIG. 11, which form a focal point between the lenses. The pinhole is placed at the focal point, so that only the highly spatially coherent (low divergence) portion of the beam is transmitted. In certain embodiments, cylindrical lenses are used instead of commonly used spherical lenses, and a slit aperture is used instead of a pinhole. Since the beam is focused into a slit aperture instead of a pinhole, the intensity in the focal point can be reduced by orders of magnitude as compared to a standard pinhole-based spatial filter. Thus, wear and damage to the slit aperture can be greatly reduced.

Beam Steering

As discussed above, MOPA systems utilize burst operation can suffer non-negligible pointing instability of the output laser beam. Output beam pointing can change by as much as several hundred micro-radians within a burst of several hundred pulses. Existing systems are not able to correct for such an error on a time scale that is less than time interval between pulses, such as 160 microseconds at repetition rate of 6 kHz. Systems and methods in accordance with embodiments of the present invention that utilize Acousto-Optical (AO) cells also can provide for fast adjustments of beam direction by utilizing the AO cells for beam steering. In addition to acting as a shutter, AO deflectors can provide for real-time correction of the pointing angle of an optical pulse passing from the master oscillator chamber to the power amplifier, as well as the output beam of the laser. Placing the AO deflector between the MO and PA can be advantageous, as transmission losses of the AO deflector can be recovered in the amplifier stage. Also, such placement allows the AO deflector to be exposed to a relatively low-power laser beam, which can be important for extending the lifetime of deflector. Placing an AO deflector in the output path of the amplified beam would cause significant damage to the deflector cell.

Figure 10A:
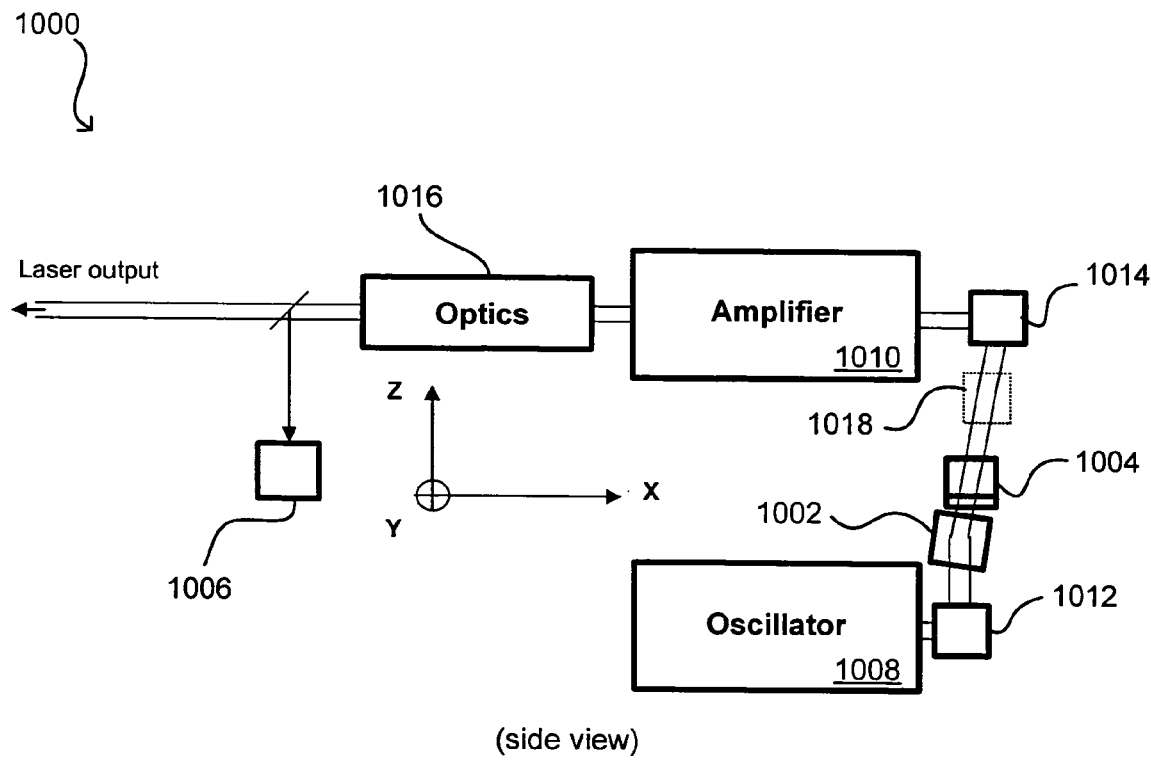
FIG. 10 is a (a) side view and (b) end view of a MOPA configuration layout using dual AO deflectors in accordance with one embodiment of the present invention.
Figure 10B:
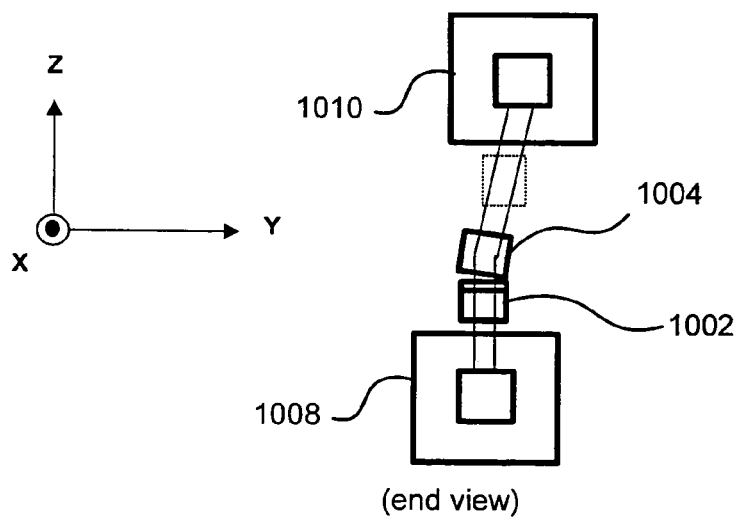

FIG. 10 is a schematic diagram showing a (a) top and (b) side view of an exemplary optical layout for a MOPA laser system 1000 utilizing beam redirection in accordance with embodiments of the present invention. Since changes in beam direction can occur in two dimensions, or two planes of beam pointing error, a pair of AO deflectors 1002, 1004 can be used between the oscillator and amplifier. A deflector 1002 can be used to correct for errors in the X-Z plane, parallel to the plane of FIG. 10(a). A second deflector 1004 can be used to correct for errors in the Y-Z plane. An advantage to using the deflectors between the MO and the PA is that the AO deflectors are exposed to pulses of relatively low pulse energy, such as on the order of about 1 to 2 mJ per pulse, which corresponds to approximately 1 to 2 mJ/cm² of laser fluence. This relatively low power level can ensure minimal probability of optical damage to the material of the deflector and, therefore, an increased lifetime. Another advantage to placing the deflectors between the MO and the PA is that the transmission losses due to the deflectors, which can be on the order of 15% to 30% per deflector, can be recovered in the amplifier stage. If AO deflectors are placed at the output of the laser, after the amplifier chamber, the loss of 15% to 30% can amount to a substantial energy loss per pulse.

The instability in the directionality of the output arises, at least in principle, from any or all stages of the optical beam path, including the oscillator 1008 (as a primary source) and the amplifier 1010, as well as any pulse stretching beam expanding, and beam folding optics 1016 positioned between the amplifier and output of the laser. Instability can arise from effects such as transient thermal distortions of the optical properties of the optics, as well as acoustic resonance effects in the oscillator. As a result, the beam path in the system can deviate from the optimal direction defined by the resonator and folding optics. Placing the deflectors between the oscillator and amplifier can require the deflectors to compensate for two contributions to the deflection angle. First, the deflectors can compensate for variations of the beam angle as the beam exits the oscillator. Second, the angle of the beam entering the amplifier can be adjusted to "pre-compensate" for the angular instabilities likely to be introduced by the amplifier and/or downstream optics. Since these angles typically can be quite small, such as on the order of about 100 mrad, it is possible to compensate for the total angular variations produced by the entire system. Compensating for the entire system at one time allows for use of a single feedback sensor 1006. The feedback sensor can measure the pointing angle of the output beam, and can provide this information to a laser control module (not shown) that, in turn, can send a correction signal to each of the AO deflectors 1002, 1004. The sensor can monitor the variation of the beam for each pulse in a burst, such that adjustments can be made between each pair of successive bursts in the pattern.

Referring back to FIG. 4, a diagram of an Acousto-Optical (AO) deflector 400 shows the basic operating principle of the deflector. The deflector typically consists of a block of optically transparent material 402 with a piezo-electric transducer 404 attached to one side. When used for beam steering, the transducer can be excited at relatively high frequency, such as on the order of from 20 MHz to 200 MHz, in order to produce an acoustic wave in the media 402. The acoustic wave can induce modulation of the refractive index in the media, in a form of sinusoidal-profile volume grating. The optical beam can diffract on this grating when Braggs condition is satisfied:

$\theta = \theta_B$ $\sin(\theta_B) = \lambda/(2\Lambda)$ $\Lambda = V/f$

This is similar to the Bragg condition discussed above, where $\Lambda$ referred to a grating period, except that here $\Lambda$ is a function of the variable sound frequency (f) and V is the velocity of sound in the deflector material. When an acoustic wave is applied across the deflector cell, a significant portion of the laser beam, such as on the order of 80% or more, is deflected at an angle of $2\theta_B$. Since the Bragg angle depends on the frequency of acoustic wave, the deflection angle can be changed by varying the acoustic frequency. The angular range of wave vector directions that satisfy Bragg condition is typically on the order of about one milliradian. Therefore, if the deflection angle has to be varied by only few hundred microradians, there may be no need to adjust the incidence angle of the incoming beam.

The time constant of an AO deflector is typically on the order of about 100 to 200 ns/mm of the beam size, which can lead to better than a 4.0 microsecond resolution for a 20 mm tall beam. The deflection angle then can be varied during the time between the pulses at repetition rates well in excess of 10 kHz. The diffraction efficiency of AO deflectors in the UV optical range is typically better than 80%.

The deflection angle of a deflector can be determined by a combination of the acoustic frequency and optical wavelength. A typical deflection angle is on the order of several milliradians. For example, assuming an excitation frequency of 200 MHz and a deflector material of fused silica (V=5.96*10$^{13}$ m/sec), the total deflection angle is approximately 6.5 mrad for a 193-nm beam. Such a deflection angle allows for a separation of the diffracted portion of the beam from the residual, non-diffracted portion. The separation can be accomplished by allowing the beam to propagate a longer distance. The separation also can be accomplished by a spatial filter. A spatial filter 1018 is shown in FIG. 10(a), which not only can serve to block the non-diffracted portion, but can serve as a relay imaging line (as explained below). Whether or not a spatial filter is used can depend on such practical factors as the available space and the diffraction angle of the deflectors.

Figure 11:
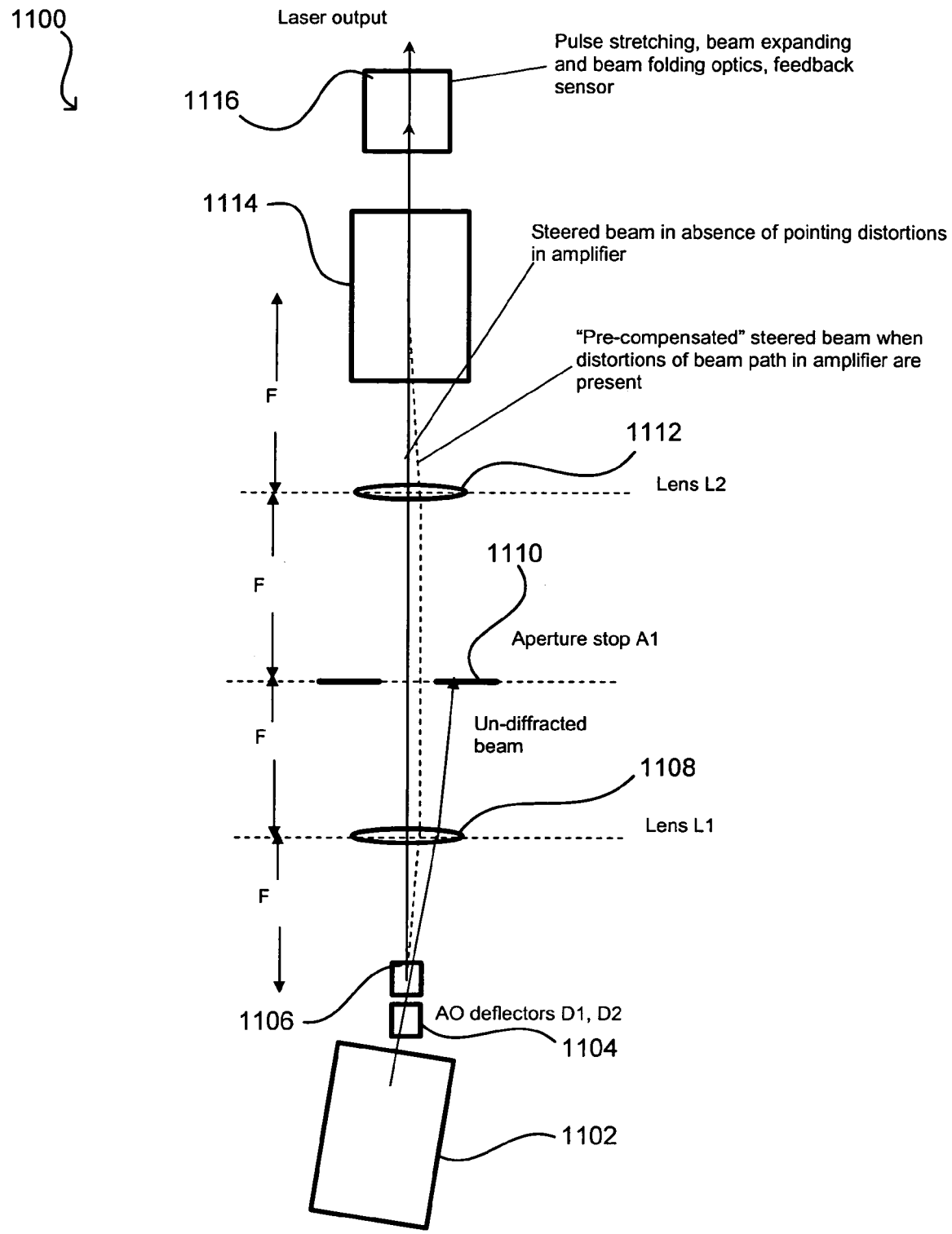
FIG. 11 is a top view of a MOPA configuration using dual AO deflectors and a spatial filter in accordance with embodiments of the present invention.

Another example of the use of a spatial filter is shown schematically in FIG. 11. A pair of positive lenses $L_1$ and $L_2$ 1108, 1112 is spaced apart by a distance that is approximately equal to the sum of focal length of each lens. Lenses $L_1$ and $L_2$ form a relay imaging line that is adjusted for infinite conjugation. FIG. 11 shows lenses with equal focal length, F, for illustrative purposes. It should be understood, however, that un-equal focal lengths can be used, such as where there is a need to expand or de-magnify the beam. Where unequal focal lengths are used, the expansion ratio can be equal to the ratio $F_2/F_1$, where $F_1$ and $F_2$ are focal lengths of lenses $L_1$ and $L_2$ respectively.

The purpose for such a relay imaging arrangement can be triple-fold. First, any lateral shift of the beam in the amplifier can be eliminated where the system "pre-compensates" for optical path distortions in the amplifier, as explained below. Second, a spatial filter can be conveniently incorporated into such an arrangement. Finally, such an arrangement can function as a beam expander, such as described above.

In a case where deflectors pre-compensate for the optical path distortions of the amplifier, the non-zero angle of the beam can lead to a shift in the position of the beam in the amplifier 1114 and downstream optics 1116 as the beam propagates between the deflectors 1104, 1106 and amplifier 1114. Even though such a shift can be small due to the presence of a small steering angle, as 0.1 mrad equals 0.1 mm per each meter of beam propagation, it still can be preferable to avoid the shift where possible. The deflectors can be placed as close to the output of the oscillator as is reasonable, in order to minimize beam displacement. In an embodiment without such an imaging arrangement, there can be a sideways shift of the beam as the beam propagates from the deflectors to the amplifier. In an embodiment with such an arrangement, such as is shown in FIG. 11, the shifting of the beam can be minimized. The amplifier and downstream optics can be placed in such way that the image plane of the deflectors formed by lens $L_2$ is located close to the component that contributes most to the pointing instability, second only to the oscillator. Effectively, this position can be close to the center of the amplifier.

In the example shown in FIG. 11, $F_2=F_1$ and the deflectors are positioned relatively close to oscillator 1102. The image plane then is at a distance F from lens $L_2$. The "pre-compensated" deflected beam after lens $L_2$ (shown by the dashed line in FIG. 11) intersects the principal (non-pre-compensated) beam at the image plane, such that the sideways shift in the image plane is eliminated. The solid line in FIG. 11 shows the actual beam path that is refracted in the amplifier. The pointing angle of the output beam, thus, is restored. Since the contribution of components downstream of the oscillator can be a fraction of the contribution of the oscillator, only a small range of angles (typically less than 100 micro-radians) may be needed entering the amplifier. This can further reduce the effects of sideways shifting of the beam in components due to steering.

An aperture stop $A_1$ can be placed close to the focal point between the lenses. The aperture can be large enough to allow steering within an angular range of roughly 1 mrad of the deflected beam. The aperture can, however, be sufficiently small to block the un-diffracted beam at an exemplary angle of 6.5 mrad.

Another parameter to be considered is the steering angular range of the AO deflector. From formulae discussed above with respect to the Bragg condition, it follows that the angular range $\Delta\theta$ is related to the frequency modulation band $\Delta f$ via the following:

$$\Delta\theta = \theta \Delta f / f$$

For example, variation of the diffracted angle within the 0.5 mrad range will require $\Delta f=15$ MHz, assuming a 200 MHz center frequency. Such deflector drivers are readily available commercially from companies such as Intra-Action Corp. of Bellwood, Ill.

The AO deflector can be made of any material that is highly transparent for UV and VUV beams, such as may include $CaF_2$, $MgF_2$, $BaF_2$, quartz, de-hydrated or fluorinated fused silica, and sapphire. In birefringent materials, such as $MgF_2$, polarization effects can be used to enhance the diffraction efficiency, for example, by using non-critical phase matching for increased acceptance angle.

Other Approaches

Figure 12:
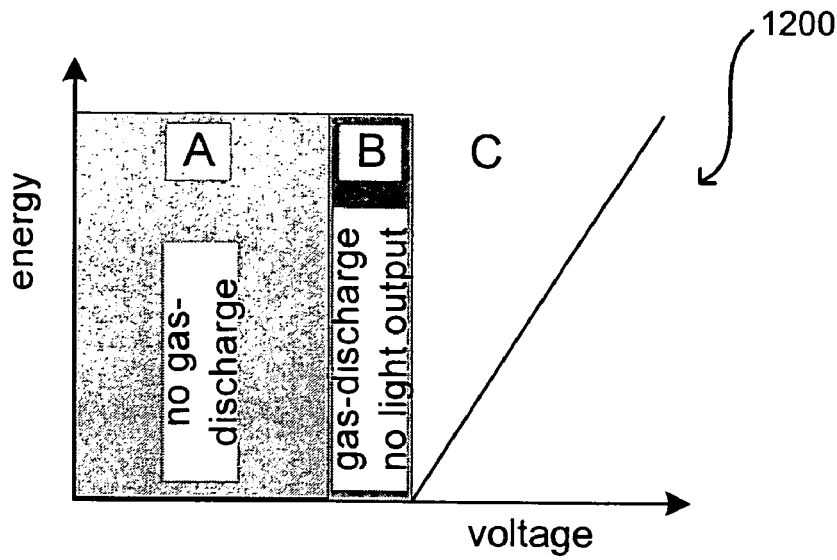
FIG. 12 is a voltage/energy plot for an excimer laser.

In addition to utilizing a fast shutter such as an AO deflector to improve laser characteristics, a number of other approaches can be taken in accordance with embodiments of the present invention. In one such approach, a laser can be operated at a relatively high voltage that is still below the laser threshold, with a characteristic voltage/energy behavior 1200 of an excimer laser being shown in FIG. 12. Below a certain voltage in area A, no gas discharge will occur. With sufficient voltage in area B, a gas discharge can occur that may still be too low to reach the condition of an oscillator to begin laser emission. With a nominal voltage applied in area C, the oscillator can generate the nominal output energy. If the laser is operated with parameters in area B in the Figure, in which gas discharge occurs but no laser output is generated, a stationary condition of the laser can be maintained, such that the regulation circuits are in a stable condition. A signal derived from the electrical discharge can be utilized to keep track of the timing between the trigger pulse and the discharge. Using such regulation, the rapid change in energy can be eliminated when the laser is turned off and on.

Figure 13:
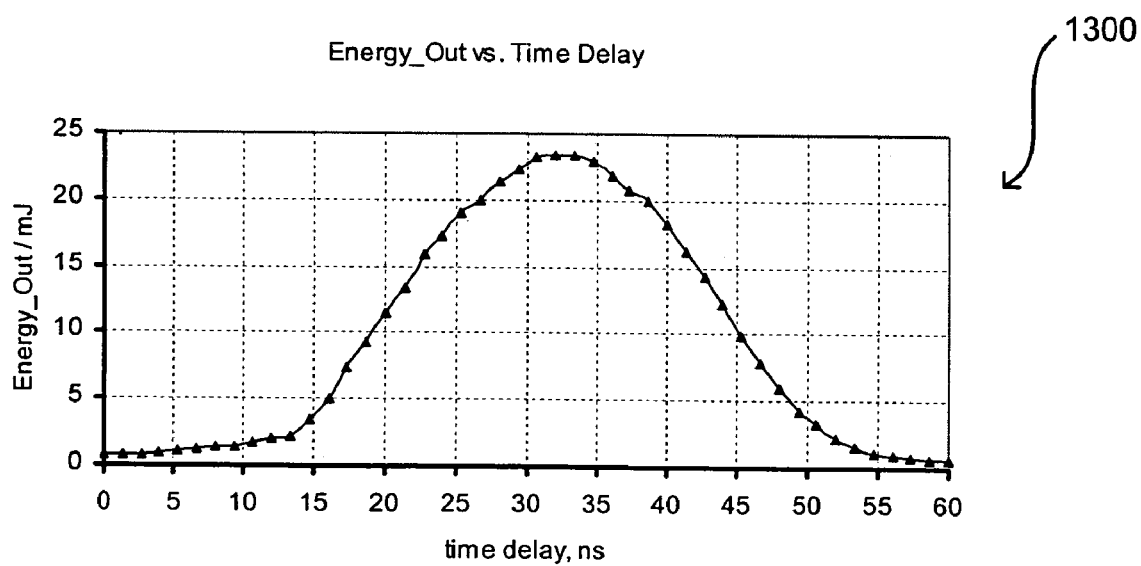
FIG. 13 is an output/delay plot for a MOPA system such as that shown in FIG. 1.

In another such approach, a delay can be added to the operation of the laser. For laser systems using an oscillator/amplifier configuration, such as that shown in FIG. 1, precise timing between the oscillator and the amplifier can be necessary to obtain a stable output. As shown in the plot 1300 of FIG. 13, the timing must be accurate to within nanoseconds in order to obtain the desired output in one such system. A delay can be actively added between the oscillator and amplifier in order to avoid generation of any amplified laser output. In a practical case, a delay on the order of about 100 ns can be added to suppress the laser output. Looking to FIG. 13, an optimal delay time for amplified output in the example is on the order of about 32 ns, while a delay of 60 ns or more would effectively prevent amplification of the optical pulses as the delay acts as a virtual shutter for the laser system. The optical pulses can still pass through the amplifier, which can be important to note as there will still be some output from the laser system during these times. Signals derived from the electrical discharge of the oscillator and/or amplifier can be used to track the timing between each trigger pulse and discharge. Alternatively, the delay can be equal to approximately half the period of the pulses.

In yet another approach, there can be a pre-pulsing of a pre-ionization unit for the laser system. Pre-ionization typically is used in an excimer laser to prepare the gas for a homogeneous gas discharge. The pre-ionization can influence the stability of the pulse, as well as the timing of the gas discharge and resulting laser pulse. In a commercial excimer laser a corona discharge can be utilized for pre-ionization. The corona can be started by a coupled circuit prior to the main discharge, and can generate the necessary electrons and ions in the discharge area to allow for a homogeneous gas breakdown once the discharge voltage appears.

Figure 14:
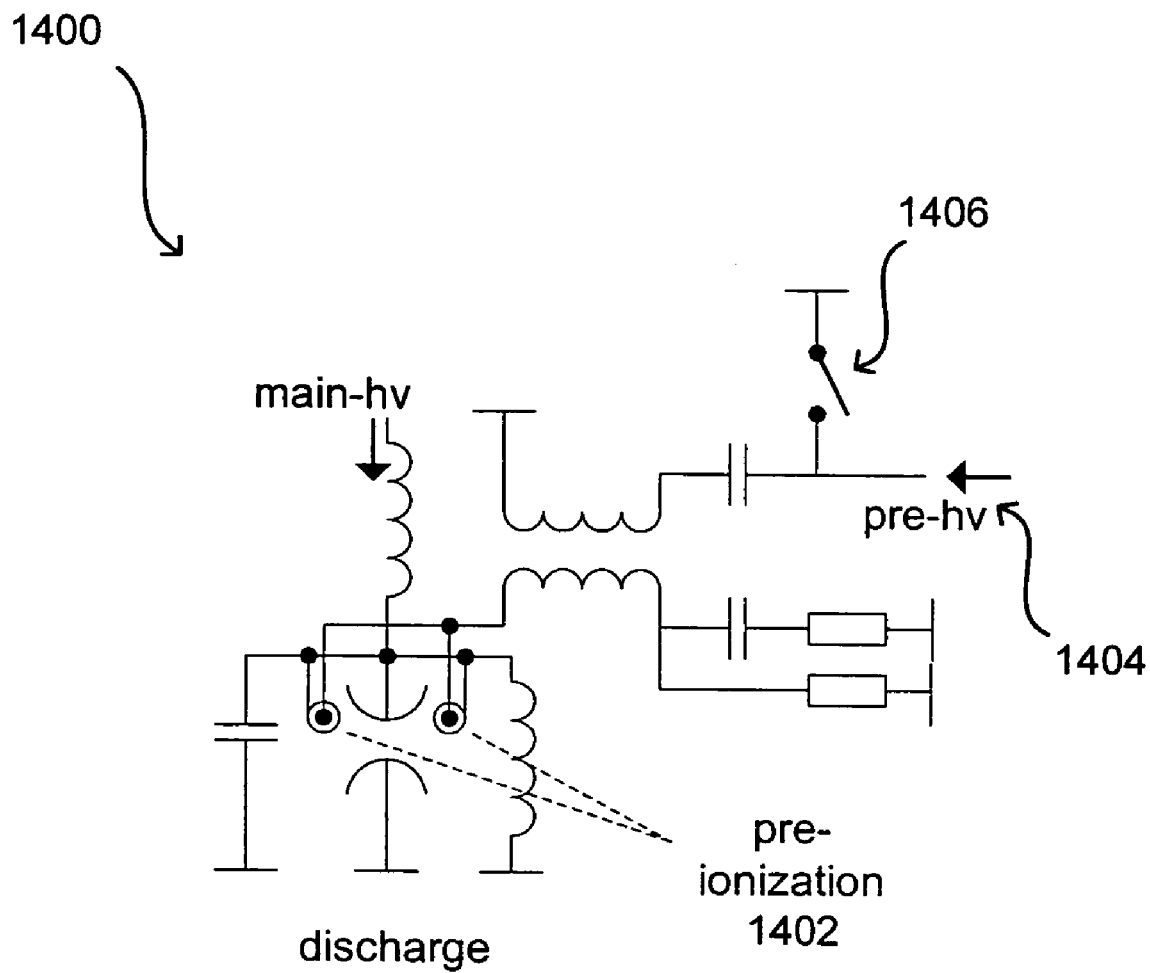
FIG. 14 is a diagram of a discharge circuit that can be used with a discharge chamber of the system of FIG. 1.

The pre-ionization can be separated from the circuit of the main discharge. FIG. 14 shows an exemplary configuration 1400 for an excimer discharge with a corona pre-ionization unit 1402, utilizing a separate supply voltage 1404 and switch 1406 for activation of a corona discharge in the discharge chamber. Here, the pre-ionization circuit can be activated without a subsequent main discharge in order to produce a pre-pulse, or pre-burst, which generates no light output but prepares the laser gas for a subsequent main discharge. In this way, the laser parameter can be stabilized. A potential disadvantage to such an approach, however, is the need for additional hardware in the laser system.

MOPA Systems

A number of MOPA configurations that can be used with embodiments of the present invention are discussed in U.S. Provisional Patent Application No. 60/448,630, entitled "MOPA EXCIMER LASER SYSTEM," incorporated herein by reference above.

A power amplifier (PA) in some embodiments can include a discharge chamber filled with a laser gas, such as a gas including molecular fluorine, and a buffer gas. Electrodes are positioned in the discharge chamber that is connected to a discharge circuit, such as an electrical delay circuit, for energizing the molecular fluorine in the chamber. The discharge of the PA can be timed to be at, or near, a maximum in discharge current when a pulse from the master oscillator (MO) reaches the amplifier discharge chamber. An aperture can be positioned between the discharge chamber and the beam expander, as well as on the other side of the discharge chamber. Various line-narrowing optics can be used, which can include one or more tuned or tuneable etalons. In one embodiment, the one or more etalons are tuned for maximum transmissivity of a selected portion of the spectral distribution of the beam, and for relatively low transmissivity of outer portions of the spectral distribution of the beam. A prism beam expander can be provided before the etalons in order to expand the beam that is incident upon the etalon(s). Two etalons can be used and tuned, as is known in the art, such that only a single interference order of the beam is selected. The line-narrowing optics can further include a grating for selecting a single interference order of the etalon(s) corresponding to the selected portion of the spectral distribution of the beam. Instead of including an etalon, the line-narrowing optics may instead include only a beam expander and a diffraction grating. A beam expander in one such embodiment includes two, three, or even four VUV transparent prisms before the grating. The grating can have a highly reflective surface serving as a resonator reflector in addition to dispersing the beam.

The line-narrowing optics can include an etalon output coupler tuned for maximum reflectivity of a selected portion of the spectral distribution of the beam, and for relatively low reflectivity of outer portions of the spectral distribution of the beam. Such a system can also include optics such as a grating, dispersive prism, or etalon, which may follow a beam expander, for selecting a single interference order of the etalon output coupler. One or more apertures can be used for reducing stray light and divergence within the resonator of the PA.

In any layout or configuration in which a grating is utilized, a highly reflective mirror can be disposed after the grating, along the path of the beam, such that the grating and HR mirror form a Littman configuration. Alternatively, the grating can serve to retro-reflect as well as disperse the beam in a Littrow configuration. A transmission grating, or grism, can also be used.

A buffer gas used in a discharge chamber can include any appropriate gas, such as for example neon or helium, for pressurizing the gas mixture in order to increase the output energy for a given input energy. Sufficiently pressurizing the gas mixture can also work to increase the energy stability, gas and tube lifetime, and pulse duration. A laser system can further include a gas supply system for transferring molecular fluorine into discharge chamber, in order to replenish the molecular fluorine. A processor or processing device can be used with the gas supply system to control the molecular fluorine concentration within the discharge chamber, in order to maintain the molecular fluorine concentration within a predetermined range of optimum performance of the laser.

A spectral filter can be positioned between the master oscillator and the power amplifier for further narrowing the line width of the output beam of the oscillator. The spectral filter can include, for example, one or more etalons following a beam expander. Alternatively, the spectral filter can include a grating for dispersing and/or narrowing the beam. Where a grating is used, the spectral filter can include a lens to focus the beam through a slit and onto a collimating optic prior to impinging upon the beam expander-grating combination.

Components of a laser system can include those discussed in published U.S. Patent Application No. 2002/0021729, incorporated herein by reference above, which discloses a molecular fluorine ($F_2$) laser system including a seed oscillator and power amplifier. The seed oscillator comprises a laser tube including multiple electrodes therein, which are connected to a discharge circuit. Seed radiation can alternatively be provided by an excimer lamp maintained at low pressure. The laser tube is part of an optical resonator for generating a laser beam including a first line of multiple characteristic emission lines around 157 nm. The laser tube can be filled with a gas mixture including molecular fluorine and a buffer gas. The gas mixture can be at a pressure below that which results in the generation of a laser emission, including the first line around 157 nm having a natural line width of less than 0.5 pm, without an additional line-narrowing optical component for narrowing the first line. The power amplifier increases the power of the beam emitted by the seed oscillator to a desired power for applications processing.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. An excimer or molecular fluorine laser system, comprising:
   a master oscillator including therein a first discharge chamber filled with a first gas mixture, the first discharge chamber containing a first plurality of electrodes for energizing the first gas mixture and generating an oscillator beam;
   a power amplifier including therein a second discharge chamber filled with a second gas mixture, the second discharge chamber containing a second plurality of electrodes for energizing the second gas mixture and amplifying the oscillator beam received from the master oscillator for output as an output beam;
   an acousto-optical modulator positioned along a beam path between the master oscillator and the power amplifier, the acousto-optical modulator operable to selectively control an amount of the oscillator beam to be received by the power amplifier; and
   a pair of cylindrical lenses positioned on either side of the acousto-optical modulator along the beam path between the master oscillator and power amplifier, the pair of cylindrical lenses operable to match a beam size of the oscillator beam to an active area of the acousto-optical modulator.

2. A laser system according to claim 1, wherein:
   the acousto-optical modulator can selectively control the amount of the oscillator beam to be received by the power amplifier by deflecting at least one portion of the oscillator beam when the acousto-optical modulator is activated, such that said at least one portion is not amplified by the power amplifier.

3. A laser system according to claim 1, wherein:
   the acousto-optical modulator is activated during an initial recovery period of the oscillator beam.

4. A laser system according to claim 1, wherein:
   the acousto-optical modulator includes a transparent media coupled with a piezo-electric transducer, the transducer capable of being excited at a frequency producing an acoustic wave in the transparent media, thereby modulating the refractive index of the transparent media.

5. A system according to claim 4, wherein:
   the piezo-electric transducer is capable of being excited at a frequency in the range of about 20 MHz to about 200 MHz.

6. A laser system according to claim 4, wherein:
the piezo-electric transducer is operated at a frequency operable to cause the oscillator beam to be deflected by a predetermined amount.

7. A laser system according to claim 4, wherein:
the piezo-electric transducer receives a first input whereby the acousto-optical cell transmits oscillator beam to the power amplifier.

8. A laser system according to claim 4, wherein:
the piezo-electric transducer receives a second input whereby the acousto-optical cell transmits at most 20% of the oscillator beam to the power amplifier.

9. A laser system according to claim 4, wherein:
the transparent media is selected from the group consisting of $CaF_2$, $MgF_2$, $BaF_2$, quartz, de-hydrated or fluorinated fused silica, and sapphire.

10. A laser system according to claim 1, further comprising:
a spatial filter positioned along the beam path between the master oscillator and power amplifier, the spatial filter operable to further separate the deflected portion from a transmitted portion.

11. A laser system according to claim 1, further comprising:
an aperture positioned along the beam path between the acousto-optical modulator and power amplifier, the aperture operable to block the deflected portion of the oscillator beam.

12. A laser system according to claim 1, wherein:
the power amplifier is further operable to compensate for any energy loss in the oscillator beam resulting from the oscillator beam passing through the acousto-optical modulator.

13. An excimer or molecular fluorine laser system, comprising:
a master oscillator including therein a first discharge chamber filled with a first gas mixture, the first discharge chamber containing a first plurality of electrodes for energizing the first gas mixture and generating an oscillator beam;
a power amplifier including therein a second discharge chamber filled with a second gas mixture, the second discharge chamber containing a second plurality of electrodes for energizing the second gas mixture and amplifying the oscillator beam received from the master oscillator for output as an output beam;
a first acousto-optical modulator positioned along a beam path between the master oscillator and the power amplifier, the first acousto-optical modulator operable to redirect at least a first portion of the oscillator beam in a first plane;
a second acousto-optical modulator positioned along a beam path between the first acousto-optical modulator and the power amplifier, the second acousto-optical modulator operable to redirect at least a second portion of the oscillator beam in a second plane; and
a feedback sensor for measuring a pointing angle of the output beam, the feedback sensor in communication with the first and second acousto-optical modulators such that at least one of the first and second acousto-optical modulators can redirect the oscillator beam.

14. A laser system according to claim 13, wherein:
the second plane is substantially orthogonal to the first plane.

15. A laser system according to claim 13, further comprising:
a directional control module operable to receive a position signal from the feedback sensor and provide a control signal to a transducer for at least one of the first and second acousto-optical modulators in order to redirect the oscillator beam.

16. A laser system according to claim 13, wherein:
at least one of the first and second acousto-optical modulators includes a transparent media coupled with a piezo-electric transducer, the transducer capable of being excited at a frequency producing an acoustic wave in the transparent media, thereby modulating the refractive index of the transparent media in order to control the direction of the oscillator beam passing through the transparent media.

17. A laser system according to claim 16, wherein:
the piezo-electric transducer is capable of being excited at a frequency in the range of about 20 MHz to about 200 MHz.

18. A laser system according to claim 16, wherein:
the transparent media is selected from the group consisting of CaF2, MgF2, BaF2, quartz, de-hydrated or fluorinated fused silica, and sapphire.

19. A laser system according to claim 13, further comprising:
a pair of cylindrical lenses positioned along the beam path between the master oscillator and power amplifier, the pair of cylindrical lenses operable to match a beam size of the oscillator beam to an active area of at least one of the first and second acousto-optical modulators.

20. A laser system according to claim 13, further comprising:
a spatial filter positioned along the beam path between the master oscillator and power amplifier, the spatial filter operable to further separate the redirected first and second portions from a transmitted portion.

21. A laser system according to claim 13, further comprising:
an aperture positioned along the beam path between the second acousto-optical modulator and the power amplifier, the aperture operable to block a transmitted portion of the oscillator beam.

22. A laser system according to claim 13, wherein:
the power amplifier is further operable to compensate for any energy loss in the oscillator beam resulting from the oscillator beam passing through the first and second acousto-optical modulators.

23. A laser system according to claim 13, further comprising:
a least one optical decoupler positioned along a path of the oscillator beam between the power amplifier and the master oscillator, the optical decoupler capable of at least one of reducing energy fluctuations and suppressing spontaneous emissions.

24. A laser system according to claim 13, wherein:
the master oscillator further includes a line-narrowing optics module for narrowing the oscillator beam in the first discharge chamber.

25. A method of generating an output beam in an excimer or molecular fluorine laser system, comprising:
generating an oscillator beam in a master oscillator;
passing the oscillator beam through a first acousto-optical modulator, the acousto-optical modulator transmitting the oscillator beam when the modulator is in a first state and deflecting the oscillator beam in a first plane when the modulator is in a second state;

passing the oscillator beam through a second acousto-optical modulator, the acousto-optical modulator transmitting the oscillator beam when the modulator is in a first state and deflecting the oscillator beam in a second plane when the modulator is in a second state;

passing the oscillator beam through a power amplifier, such that the oscillator beam is amplified for output as the output beam;

measuring a pointing angle of the output beam; and adjusting at least one of the first and second acousto-optical modulators in response to the measured pointing angle.

26. A method according to claim 25, further comprising:
further separating the transmitted beam and deflected beam using a spatial filter between the master oscillator and power amplifier.

27. A method according to claim 25, further comprising:
blocking the transmitted beam using an aperture positioned between the master oscillator and power amplifier.

28. An excimer or molecular fluorine laser system, comprising:

a master oscillator including therein a first discharge chamber filled with a first gas mixture, the first discharge chamber containing a first plurality of electrodes for energizing the first gas mixture and generating an oscillator beam;

a power amplifier including therein a second discharge chamber filled with a second gas mixture, the second discharge chamber containing a second plurality of electrodes for energizing the second gas mixture and amplifying the oscillator beam received from the master oscillator for output as an output beam;

at least one optical element for changing the propagation direction of the beam, said element being positioned along a beam path between the master oscillator and the power amplifier; and a position sensor for monitoring the pointing angle of the output beam, said position sensor providing feedback to the optical element for controlling the propagation direction of the beam.

29. A laser system as recited in claim 28, wherein the optical element is a first acousto-optical modulator.

30. A laser system as recited in claim 29, further including a second acousto-optical modulator and wherein the first acousto-optical modulator deflects the beam in a first plane and the second acousto-optical modulator deflects the beam in a second plane orthogonal to the first plane.

* * * * *